June 11, 1957   I. OTS   2,795,133
APPARATUS FOR TESTING WORKPIECES WITH ULTRASONIC WAVES
Filed March 4, 1954

United States Patent Office 2,795,133
Patented June 11, 1957

2,795,133

APPARATUS FOR TESTING WORKPIECES WITH ULTRASONIC WAVES

Ivan Ots, Mont-sur-Marchienne, Belgium, assignor to Ateliers de Constructions Electriques de Charleroi, Brussels, Belgium, a corporation of Belgium Application March 4, 1954, Serial No. 414,115

Claims priority, application France March 6, 1953

4 Claims. (Cl. 73—67.7)

The present invention relates to the use of ultrasonic waves for testing and examining materials.

Ultrasonic testing devices are known in which a transmitter and a receiver are immersed in a bath of liquid, for example water, oil or mercury, together with the piece to be examined. In these known arrangements, the test piece is immersed in the bath between the transmitter and the receiver and a beam of ultrasonic waves traverses the test piece in a theoretically straight line. The ultrasonic waves thus pass directly through the test piece from the transmitter to the receiver in somewhat the same manner that X-rays pass through a solid body. The known apparatus customarily uses feelers in contact with the piece that is to be examined.

It is an object of the present invention to provide a novel apparatus using ultrasonic radiation in the examination of solid articles in such manner as to achieve greater sensitivity and greater accuracy. Moreover, the apparatus in accordance with the invention avoids the need of using feelers which contact the test piece and are hence subject to wear by relative movement of the test piece and the feelers. The present invention is particularly suitable for the continuous examination of welded tubes, the term "tube" being herein used in a generic sense to include tubing, pipes, beams, columns and other members of similar nature. However, the invention is in no way limited to this particular application but may be used for testing any object the shape of which permits an examination by ultrasonic waves in the manner pointed out below.

In accordance with the invention, the piece to be examined is only partly submerged in liquid with a portion of the piece projecting above the liquid surface. A transmitter immersed in the liquid is directed toward the piece to be examined in a direction angling up toward the surface of the liquid so that the ultrasonic waves enter the piece through a submerged portion, are reflected internally by surfaces of unsubmerged portions of the piece and reenter the liquid through a submerged portion. A receiver is immersed in the liquid in a position to receive ultrasonic waves transmitted in the manner just described. The transmitter and receiver are both directional. Thus, the transmitter sends out waves in the desired direction and the receiver picks up waves coming from a predetermined direction. If there are any defects in the piece being examined, for example a defect in the weld of welded pipe, the ultrasonic waves are diverted from their normal path and are hence not picked up by the receiver.

Ultrasonic waves have very good directivity in their propagation media—liquids or solids—and conform to the geometrical laws of optics. Thus, a beam of ultrasonic waves is refracted when it passes from a liquid into a solid. Moreover, surfaces of solids or liquids act as reflecting surfaces with respect to ultrasonic waves that are propagated toward them. As with light, the angle of reflection is equal to the angle of incidence. The reflection is especially pronounced when ultrasonic waves traveling through a solid reach a surface that is in contact with the air or other gas. Where a solid surface is in contact with water or other liquid, the ultrasonic waves are transmitted from the solid to the liquid.

The present invention utilizes these principles in an advantageous manner. Ultrasonic waves emitted by an immersed transmitter travel through the liquid into a submerged portion of the tube or other object being examined and are reflected one or more times by surfaces of the unsubmerged portion of the object. The waves are directed toward the tube so that, following the laws of optics, in a preselected path, they are reflected along and ultimately are directed to the immersed receiver providing that no defect in the tube—for example a defect in the welded seam—is encountered. Hence, normal reception by the receiver indicates that the tube is free of defects. When a defect occurs, the normal transmission of ultrasonic waves to the receiver is interrupted or diminished, the defect can readily be located since the geometrical path of travel of the ultrasonic waves is preselected and hence known. By reason of the way in which the waves are transmitted and reflected in accordance with the invention, it is possible to locate defects which might be missed by known methods and their location can be accurately determined.

The objects and advantages of the invention will be more fully understood from the following description and claims in conjunction with the accompanying drawings, in which:

Figure 2:
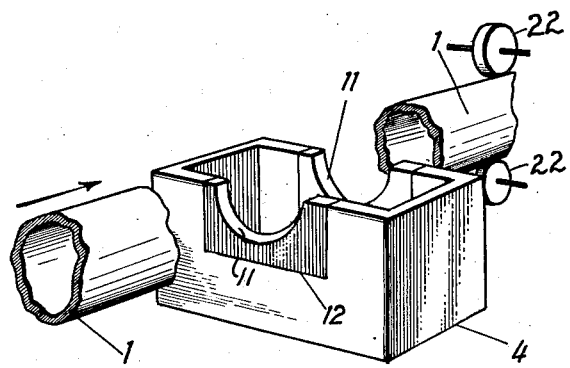
Fig. 2 is a schematic perspective view of the apparatus, portions being omitted for the sake of clarity.
Figure 1:
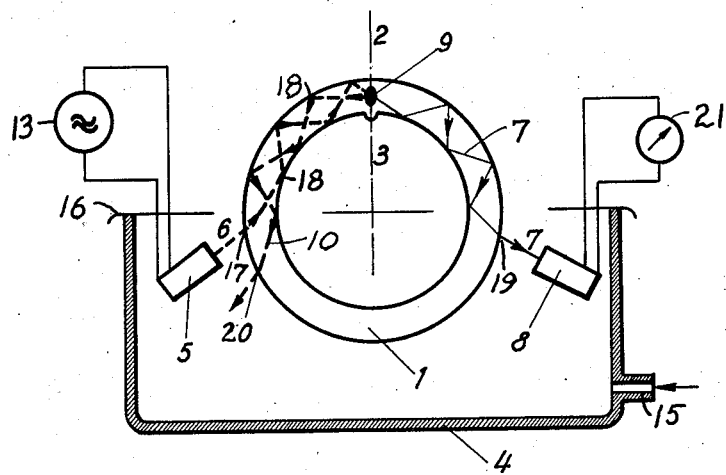
Fig. 1 is a schematic cross sectional view illustrating a method of continuously examining the longitudinal seam of a welded tube. In this figure, cross hatching of the tube has been omitted in order to avoid confusion with lines indicating the path of travel of ultrasonic waves in the tube.

A tube 1 that is to be examined has a longitudinal welded seam indicated by the line 2—3 in Fig. 1. The tube has approximately half its section immersed in a bath of water or other liquid contained in a tank 4. The tube 1 is positioned in the tank 4 by resting in semicircular recesses 11 in insets 12 provided in opposite side walls of the tank. The insets 12 are preferably formed of felt, rubber, leather or similar material, providing resilient contact with the tube so as to minimize the leakage of water around it and also minimize the transmission of vibrations between the tube and the tank. Water is continuously supplied to the tank 4 through a suitable inlet 15 and allowed to overflow over the rim 16 of the tank so as to maintain a constant water level despite any leakage that may occur through the notches 11. The insets 12 are preferably made removable and interchangeable so that different insets can be used to accommodate tubes or other objects of different shapes or sizes.

An ultrasonic transmitter 5 supplied by a suitable power source 13 is immersed in the water bath and directed upwardly and toward the tube, as shown, so that ultrasonic waves emitted by the transmitter follow the path represented by the heavy broken line 6. It will be seen that these waves travel through the liquid and enter an immersed portion of the tube at 17. They then travel through the wall of the tube, being reflected at points 18 in that portion of the tube that is above the liquid level. If unimpeded, the waves would continue along the lighter broken line 7 with further reflections from the air-contacting surfaces of the tube and eventually leave a submerged portion of the tube at 19, being thereupon transmitted through the liquid to a directional receiver 8.

However, if the ultrasonic waves strike an obstacle 9, such as an inclusion of air in the welded joint 2—3, they are deflected from their normal path. For example, as shown in Fig. 1, the ultrasonic waves are reflected by the obstacle 9 along a path represented by the heavy broken line 10. After multiple reflections from the surface of the tube, the waves leave the tube at 20. The direction of the deflected waves depends on the position and the area of the defect encountered but, in any event, the waves do not reach the receiver 8. The receiver 8 thus receives less ultrasonic intensity when the joint 2—3 is defective than when it is normal. By providing an indicator 21 to show the intensity of the ultrasonic waves received by the receiver 8, the presence of a defect in the welded seam is readily detected.

The correct positions of the transmitter 5 and receiver 8 are readily determined by using the laws of refraction and reflection of ultrasonic waves. Thus, for example the path of the waves can be laid out geometrically or calculated mathematically and the transmitter and receiver are thereupon positioned accordingly. As will be seen from Fig. 1, the waves are transmitted through the unsubmerged portion of the tube by multiple reflections from surfaces of the tube in contact with the air. When an examination is being made of a longitudinal weld in tubing, the weld is preferably positioned at the top, as illustrated in Fig. 1. It is desirable that the width of the beam of ultrasonic waves emitted by the transmitter 5 be such that, through the multiple reflections of the waves, the entire thickness of the part to be examined is uniformly irradiated. For this purpose, it is desirable to select the angle of incidence of the ultrasonic waves to the test piece in such a way that all of the rays entering the piece are forced to traverse the unsubmerged part if the latter does not present any defects. The choice of this angle can also determine the depth of immersion of the test piece in the liquid.

The continuous examination of tubing can be effected by moving the tube longitudinally across the tank. It has been found desirable in some instances to line the tank with a material such as cotton for absorbing ultrasonic waves so as to avoid any danger of parasitic reception due to reflections from the walls of the tank.

In examining welded tubing, it is usually necessary only to examine the weld area since any defects are likely to occur here rather than in other portions of the tube circumference. However, if it is desired to examine portions of the tube other than the weld, this can readily be done by suitable rotation of the tube in the supporting and positioning notches 11. For example the tube may be moved both longitudinally and rotationally. The location of a defect in a circumferential direction can be readily determined by rotating the tube slowly and observing the angular position of the tube in which the indication of the defect disappears. In some instances, it may be desirable to advance the tube across the tank with a spiral motion.

While a preferred example of apparatus in accordance with the invention has been shown in the accompanying drawings and herein described, it will be understood that the invention is in no way limited to this embodiment.

What I claim and desire to secure by Letters Patent is:

1. A system for testing the internal structure of a tube comprising a receptacle containing liquid having a free surface, means for positioning a portion of the length of the tube in the receptacle so that it is only partially submerged in said liquid, means in said liquid for projecting ultrasonic waves through said liquid and into said tube at a predetermined angle toward the surface of said liquid in a direction so that the waves travel along a predetermined path entering said tube through a submerged portion, being reflected internally around said tube by surfaces of unsubmerged portions of said tube and normally reentering said liquid in a predetermined direction from a submerged portion of said tube and means in said liquid positioned to receive said waves when they travel along said path and enter the liquid in said predetermined direction, said waves being diverted from said path by any defect in said tube whereby the presence of said defect is indicated by a decrease in the reception of waves by said receiver.

2. A system for testing the internal structure of a tube, comprising a liquid-containing tank having opposite side walls, said walls being cut away to provide opposed recesses of a size and shape to fit said tube and support said tube in a position in which it is only partially submerged in liquid contained in said tank, means for supplying liquid to said tank to maintain liquid in the tank at a predetermined level above the bottoms of said recesses but below the top of a tube supported in said recesses, an ultrasonic transducer immersed in the liquid in said tank and positioned to direct ultrasonic waves upwardly at a predetermined angle toward said tube so as to travel along a path entering a submerged portion of the tube, reflected internally by surfaces of the tube wall that are above the liquid level and normally reentering said liquid in a predetermined direction from a submerged portion of the tube, and a receiver immersed in said liquid in a position selectively to receive ultrasonic waves travelling along said path and reentering the liquid in said predetermined direction, said waves being diverted from said path by any defect occurring in said tube whereby said defect is indicated by a decrease in the reception of waves by said receiver.

3. A system according to claim 2 in which said recesses are lined with insets of resilient material set in said opposite side walls of said tank, said material being soft enough to be appreciably compressed by said tube.

4. A system for continuously examining a straight tube, comprising a liquid-containing tank having opposite side walls, said walls being cut away to provide opposed recesses of a size and shape to receive said tube and support it in a position extending across said tank and only partly submerged in liquid contained in said tank, means for supplying liquid to said tank to maintain liquid in the tank at a predetermined level above the bottoms of said recesses but below the top of a tube supported in said recesses, an ultrasonic transducer immersed in the liquid in said tank and positioned to direct ultrasonic waves upwardly at a predetermined angle toward said tube so as to travel along a predetermined path entering a submerged portion of the tube, through the upper unsubmerged wall portion of the tube by reflection internally from surfaces of the tube and reentering the liquid at a predetermined location and in a predetermined direction from a submerged portion of the tube, a receiver immersed in said liquid in a position selectively to receive ultrasonic waves travelling along said path and emerging from said tube in said location and direction, said waves being diverted from said path by any defect occurring in the unsubmerged portion of the tube, and means for moving said tube longitudinally across said tank while said transmitter and receiver are in operation.

References Cited in the file of this patent

UNITED STATES PATENTS

| | | |
|---|---|---|
| 2,503,400 | Mason | Apr. 11, 1950 |
| 2,527,986 | Carlin | Oct. 31, 1950 |
| 2,592,135 | Firestone | Apr. 8, 1952 |

FOREIGN PATENTS

| | | |
|---|---|---|
| 615,684 | Great Britain | Jan. 10, 1949 |
| 889,840 | Germany | Sept. 14, 1953 |